US012696872B2

(12) United States Patent
Nakai et al.

(10) Patent No.: US 12,696,872 B2
(45) Date of Patent: Aug. 4, 2026

(54) ANIMAL BEHAVIOR RECORDING DEVICE, ANIMAL BEHAVIOR RECORDING METHOD, AND PROGRAM

(71) Applicants:FURUKAWA ELECTRIC CO., LTD., Tokyo (JP); NATIONAL UNIVERSITY CORPORATION HOKKAIDO UNIVERSITY, Hokkaido (JP)

(72) Inventors: Yukako Nakai, Tokyo (JP); Kunio Odaka, Tokyo (JP); Tomofumi Kise, Tokyo (JP); Masayuki Fukushima, Tokyo (JP); Hirokazu Narui, Tokyo (JP); Takayuki Ishii, Tokyo (JP); Miku Yamasaki, Tokyo (JP); Koichiro Ueda, Hokkaido (JP)

(73) Assignees: FURUKAWA ELECTRIC CO., LTD., Tokyo (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 21 days.

(21) Appl. No.: 18/851,693

(22) PCT Filed: Mar. 31, 2023

(86) PCT No.: PCT/JP2023/013525
§ 371 (c)(1),
(2) Date: Sep. 27, 2024

(87) PCT Pub. No.: WO2023/191043
PCT Pub. Date: Oct. 5, 2023

(65) Prior Publication Data
US 2025/0212842 A1 Jul. 3, 2025

(30) Foreign Application Priority Data
Mar. 31, 2022 (JP) ................................. 2022-059711

(51) Int. Cl.
| | | |
|---|---|---|
| *A01K 11/00* | (2006.01) | |
| *A01K 27/00* | (2006.01) | |
| *A01K 29/00* | (2006.01) | |

(52) U.S. Cl.
CPC .......... *A01K 11/008* (2013.01); *A01K 27/001* (2013.01); *A01K 29/005* (2013.01)

(58) Field of Classification Search
CPC ... A01K 11/008; A01K 27/001; A01K 29/005
(Continued)

(56) References Cited

U.S. PATENT DOCUMENTS

| | | | |
|---|---|---|---|
| 2019/0012497 A1* | 1/2019 | Ralston | ................ A01K 11/006 |
| 2020/0214266 A1 | 7/2020 | Fujiyama | |

(Continued)

FOREIGN PATENT DOCUMENTS

| | | | |
|---|---|---|---|
| JP | 2017060407 A | | 3/2017 |
| JP | 6409028 | * | 9/2018 |

(Continued)

OTHER PUBLICATIONS

Extended European Search Report issued Jun. 20, 2025 in the EP Patent Application No. 23781051.0.
(Continued)

*Primary Examiner* — Omar Casillashernandez
(74) *Attorney, Agent, or Firm* — CKC & PARTNERS CO., LLC

(57) ABSTRACT

This animal behavior recording device is provided with a processing unit which acquires animal behavior information, that is, information indicating the behavior of an animal, acquires animal position information, that is, information indicating the positions where the animal is present, estimates the behavior of the animal on the basis of the animal behavior information and the animal position information, and records the behavior in time series. Acceleration data (Continued)

acquired from an acceleration sensor disposed on the animal and/or angular velocity data acquired from an angular velocity sensor disposed on the animal can be used as the animal behavior information, and the processing unit is capable of estimating the behavior of the animal on the basis of one of the animal behavior information and the animal position information and correcting the estimated behavior by using the other information.

12 Claims, 15 Drawing Sheets

(58) Field of Classification Search
USPC ........................................................ 340/573.3
See application file for complete search history.

(56) References Cited

U.S. PATENT DOCUMENTS

| | | | | |
|---|---|---|---|---|
| 2020/0404886 A1* | 12/2020 | Gibbs | .................. | A01K 27/009 |
| 2022/0200519 A1* | 6/2022 | Biffert | ..................... | G01P 15/00 |
| 2023/0140858 A1* | 5/2023 | Van Curen | ........... | A01K 29/005 |
| | | | | 119/712 |

FOREIGN PATENT DOCUMENTS

| | | | |
|---|---|---|---|
| JP | 6409028 | B2 | 10/2018 |
| JP | 2019122368 | A | 7/2019 |
| JP | 2020198829 | A | 12/2020 |
| JP | 6925638 | B2 | 8/2021 |
| WO | 2018012005 | A1 | 1/2018 |
| WO | 2019058752 | A1 | 3/2019 |
| WO | 2020188735 | A1 | 9/2020 |
| WO | 2021230316 | A1 | 11/2021 |
| WO | WO2021230316 | * | 11/2021 |

OTHER PUBLICATIONS

Jun Wang et al. "Development and validation of an ensemble classifier for real-time recognition of cow behavior patterns from accelerometer data and location data" PLoS One, 13(9), USA, Sep. 7, 2018, [online], [Accessed Jan. 13, 2026], [Source] <https://doi.org/10.1371/journal.pone.0203546>.

Notification of Reasons for Refusal issued Jan. 27, 2026 in the JP Patent Application No. 2022-059711.

Office Action issued Feb. 13, 2026 in the CN Patent Application No. 202380032070.2.

* cited by examiner

CORRESPONDENCE RELATIONSHIP BETWEEN BEHAVIOR
TYPE AND SENSOR DATA

| BEHAVIOR TYPE | CORRESPONDING ACCELERATION AND ANGULAR VELOCITY |
|---|---|
| DRINKING WATER | $\{\alpha x1,\ \alpha y1,\ \alpha z1;\omega x1,\ \omega y1,\ \omega z1\}$ |
| FEEDING (ARTIFICIAL MILK, HAY) | $\{\alpha x2,\ \alpha y2,\ \alpha z2;\omega x2,\ \omega y2,\ \omega z2\}$ |
| RUMINATION | $\{\alpha x3,\ \alpha y3,\ \alpha z3;\omega x3,\ \omega y3,\ \omega z3\}$ |
| SUCKLING | $\{\alpha x4,\ \alpha y4,\ \alpha z4;\omega x4,\ \omega y4,\ \omega z4\}$ |
| HEAD SHAKING | $\{\alpha x5,\ \alpha y5,\ \alpha z5;\omega x5,\ \omega y5,\ \omega z5\}$ |
| MOVING (WALKING) | $\{\alpha x6,\ \alpha y6,\ \alpha z6;\omega x6,\ \omega y6,\ \omega z6\}$ |
| MOVING(RUNNING) | $\{\alpha x7,\ \alpha y7,\ \alpha z7;\omega x7,\ \omega y7,\ \omega z7\}$ |
| STANDING MOTION | $\{\alpha x8,\ \alpha y8,\ \alpha z8;\omega x8,\ \omega y8,\ \omega z8\}$ |
| LYING DOWN MOTION | $\{\alpha x9,\ \alpha y9,\ \alpha z9;\omega x9,\ \omega y9,\ \omega z9\}$ |
| COUGHING | $\{\alpha x10,\ \alpha y10,\ \alpha z10;\omega x10,\ \omega y10,\ \omega z10\}$ |
| LYING DOWN STATE, STANDING STATE | $\{\alpha x11,\ \alpha y11,\ \alpha z11;\omega x11,\ \omega y11,\ \omega z11\}$ |

FIG. 6

EXAMPLE CONFIGURATION OF INSTALLATION
LOCATION INFORMATION TABLE

1222

| TYPE OF INSTALLATION | LOCATION INFORMATION |
|---|---|
| FEEDING AREA | $X11 \sim X12$, $Y11 \sim Y12$ |
| MILK-FEEDING AREA | $X21 \sim X22$, $Y21 \sim Y22$ |
| WATER-DRINKING AREA | $X31 \sim X32$, $Y31 \sim Y32$ |
| ... | ... |

FIG. 7

EXAMPLE CONFIGURATION OF BEHAVIOR RECORD STORAGE UNIT

| INDIVIDUAL ID | DATE AND TIME | TIME | ACCELERATION | ANGULAR VELOCITY | ESTIMATED BEHAVIOR TYPE | LOCATION | ESTIMATED STAY LOCATION | CORRECTED BEHAVIOR TYPE |
|---|---|---|---|---|---|---|---|---|
| 001 | JANUARY 25, 2021 | 15:00:00 | $\alpha x1,\ \alpha y1,\ \alpha z1$ | $\omega x1,\ \omega y1,\ \omega z1$ | FEEDING | x1, y1 | FEEDING AREA | FEEDING |
| 001 | JANUARY 25, 2021 | 15:00:02 | $\alpha x2,\ \alpha y2,\ \alpha z2$ | $\omega x2,\ \omega y2,\ \omega z2$ | FEEDING | x2, y2 | FEEDING AREA | FEEDING |
| 001 | JANUARY 25, 2021 | 15:00:04 | $\alpha x3,\ \alpha y3,\ \alpha z3$ | $\omega x3,\ \omega y3,\ \omega z3$ | SUCKLING | x3, y3 | FEEDING AREA | FEEDING |
| 001 | JANUARY 25, 2021 | 15:00:06 | $\alpha x4,\ \alpha y4,\ \alpha z4$ | $\omega x4,\ \omega y4,\ \omega z4$ | FEEDING | x4, y4 | FEEDING AREA | FEEDING |
| 001 | JANUARY 25, 2021 | 15:00:08 | $\alpha x5,\ \alpha y5,\ \alpha z5$ | $\omega x5,\ \omega y5,\ \omega z5$ | FEEDING | x5, y5 | FEEDING AREA | FEEDING |
| ⋮ | ⋮ | ⋮ | ⋮ | ⋮ | ⋮ | ⋮ | ⋮ | ⋮ |

FIG. 8

EXAMPLE CONFIGURATION OF BEHAVIOR RECORD STORAGE UNIT

| INDIVIDUAL ID | DATE AND TIME | TIME | LOCATION | ESTIMATED STAY LOCATION | MOVING | ACCELERATION | ANGULAR VELOCITY | ESTIMATED BEHAVIOR TYPE | ESTIMATED BEHAVIOR TYPE |
|---|---|---|---|---|---|---|---|---|---|
| 001 | JANUARY 25, 2021 | 15:00:00 | x1, y1 | FEEDING AREA | NO | αx1, αy1, αz1 | ωx1, ωy1, ωz1 | FEEDING | FEEDING |
| 001 | JANUARY 25, 2021 | 15:00:02 | x2, y2 | FEEDING AREA | NO | αx2, αy2, αz2 | ωx2, ωy2, ωz2 | RUMINATION | RUMINATION |
| 001 | JANUARY 25, 2021 | 15:00:04 | x3, y3 | WATER-DRINKING AREA | NO | αx3, αy3, αz3 | ωx3, ωy3, ωz3 | DRINKING WATER | DRINKING WATER |
| 001 | JANUARY 25, 2021 | 15:00:06 | x4, y4 | WATER-DRINKING AREA | NO | αx4, αy4, αz4 | ωx4, ωy4, ωz4 | STANDING STATE | RESTING |
| 001 | JANUARY 25, 2021 | 15:00:08 | x5, y5 | MILK-FEEDING AREA | YES | αx5, αy5, αz5 | ωx5, ωy5, ωz5 | MOVING (WALKING) | WALKING |
| ⋮ | ⋮ | ⋮ | ⋮ | ⋮ | ⋮ | ⋮ | ⋮ | ⋮ | ⋮ |

FIG. 9

EXAMPLE CONFIGURATION OF PROCESSING TARGET
DATA STORAGE UNIT

| INDIVIDUAL ID | SENSOR DEVICE ID | COW BREED | GENDER | AGE | HEALTH CONDITION | MEDICAL HISTORY |
|---|---|---|---|---|---|---|
| 001 | S01 | HOLSTEIN | FEMALE | 2 | 5 | NO |
| 002 | S20 | JERSEY | MALE | 3 | 3 | NO |
| 003 | S05 | HOLSTEIN | FEMALE | 2 | 4 | NO |
| ... | ... | ... | ... | ... | ... | ... |

EXAMPLE OF DATA PROCESSING FLOW OF
BEHAVIOR ESTIMATION PROCESSING
(FIRST EMBODIMENT)

EXAMPLE OF DATA PROCESSING FLOW OF ESTIMATION RESULT
CORRECTION PROCESSING
(FIRST EMBODIMENT)

EXAMPLE OF DATA PROCESSING FLOW OF
DATA ACQUISITION PROCESSING
(SECOND EMBODIMENT)

EXAMPLE OF DATA PROCESSING FLOW OF BEHAVIOR ESTIMATION
PROCESSING AND ESTIMATION RESULT CORRECTION PROCESSING
(SECOND EMBODIMENT)

FIG. 14
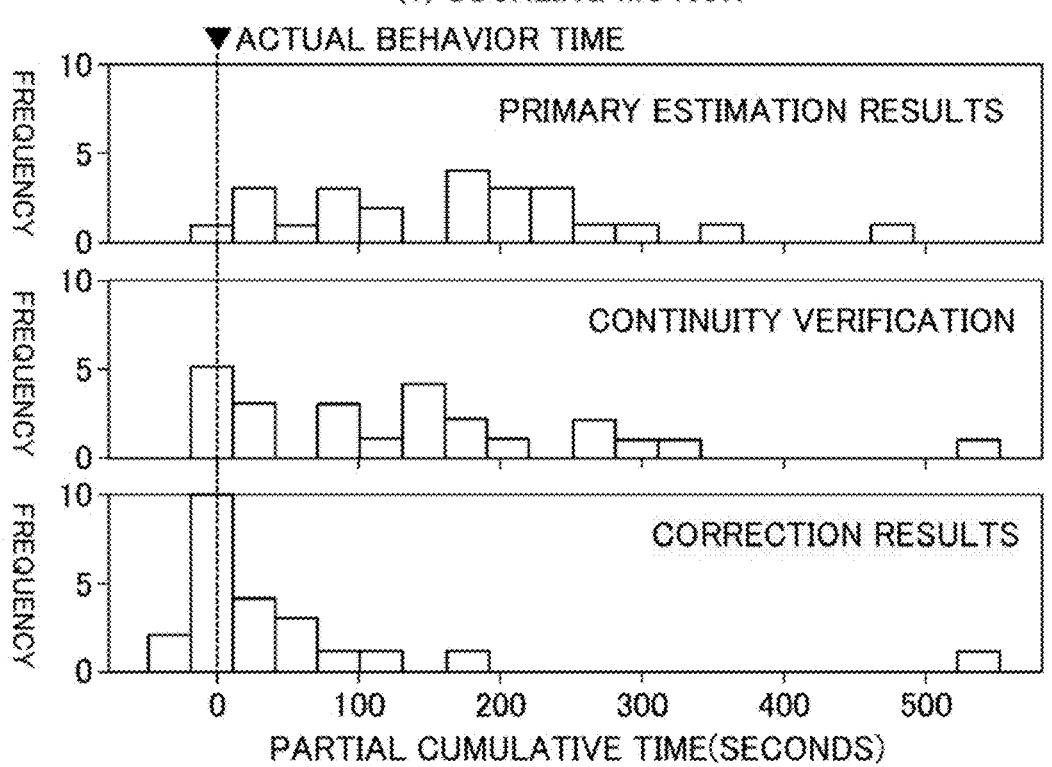
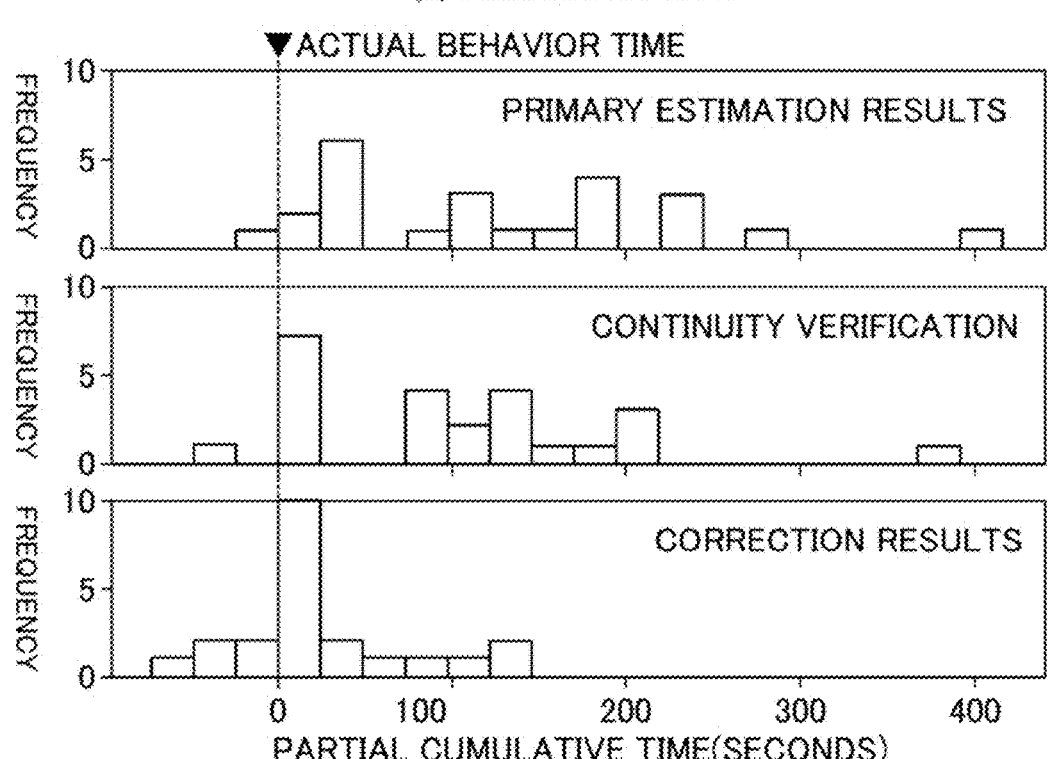

ANIMAL BEHAVIOR RECORDING DEVICE, ANIMAL BEHAVIOR RECORDING METHOD, AND PROGRAM

TECHNICAL FIELD

The present invention relates to an animal behavior recording device, an animal behavior recording method, and a program.

BACKGROUND ART

In order to maintain stable dairy farming management, it has become important to efficiently manage the health of the animals being bred. For example, Patent Documents 1 and 2 disclose technologies that attach barometric sensors and accelerometers to animals, estimate their posture based on the measured data, and determine the health conditions of the animals or detect the occurrence of abnormalities.

CITATION LIST

Patent Document

Patent Document 1: Japanese Unexamined Patent Application, Publication No. 2017-060407

Patent Document 2: Japanese Unexamined Patent Application, Publication No. 2020-198829

DISCLOSURE OF THE INVENTION

Problems to be Solved by the Invention

However, the technologies disclosed in Patent Documents 1 and 2 using acceleration data and barometric pressure data involve issues with insufficient accuracy in estimating the posture of the animals under management. Consequently, the accuracy in predicting the changes in health conditions based on this data is also insufficient. The inability to accurately predict the posture of animals leads to, for example, missing the signs in prediction of estrus and calving in parous cows.

One of the objects of the present invention is to provide an animal behavior recording device, an animal behavior recording system, an animal behavior recording method, and a program, which are capable of accurately and efficiently understanding animal behavior.

Means for Solving the Problems

One aspect of the present invention is an animal behavior recording device, which includes: an animal behavior information acquisition unit that acquires animal behavior information that is information indicating behavior of an animal being bred within a predefined breeding area; an animal location information acquisition unit that acquires animal location information that is information indicating a location where the animal exists; and an animal behavior recording unit that estimates and chronologically records the behavior of the animal, based on the animal behavior information and the animal location information.

The animal behavior information may be acceleration data acquired from an accelerometer provided on the animal and/or angular velocity data acquired from an angular velocity sensor provided on the animal. The animal behavior recording unit may include: a behavior estimation unit that estimates the behavior of the animal, based on the acceleration data and/or the angular velocity data; and an estimation result correction unit that corrects the behavior of the animal estimated by the behavior estimation unit, based on the animal location information.

The storage unit may store information on locations of a plurality of types of installations necessary for breeding the animal, the installations being arranged in the breeding area. The estimation result correction unit may identify a type of installation at a location where a target animal exists, based on stored location information on the installation and the animal location information, and correct the behavior of the animal estimated by the behavior estimation unit, based on the type of the installation identified.

The animal behavior information may be acceleration data acquired from an accelerometer provided on the animal and/or angular velocity data acquired from an angular velocity sensor provided on the animal. The animal behavior recording unit may include: a behavior estimation unit that estimates a location where the animal exists and behavior of the animal at the location, based on the animal location information; and an estimation result correction unit that corrects the estimated location where the animal exists and the estimated behavior of the animal, through comparison with the animal behavior information acquired.

The storage unit may store information on locations of a plurality of types of installations necessary for breeding the animal, the installations being arranged in the breeding area. The behavior estimation unit may identify a type of installation at a location where a target animal exists, based on the stored location information on the installation and the animal location information, and estimate behavior of the target animal, based on the type of installation identified.

The behavior estimation unit may estimate the behavior of the animal using a trained model that has been pre-trained with the relationship between the acceleration data and/or angular velocity data acquired from the animal and the behavior of the animal categorized into a plurality of types.

The behavior estimation unit may estimate the behavior of the animal, based on a statistical correspondence relationship between the behavior of the animal and the acceleration data and/or angular velocity data acquired from the animal.

The animal location information may be calculated based on a direction of arrival of radio waves transmitted via a communication unit from the accelerometer and/or angular velocity sensor provided on the animal.

The animal behavior records being chronologically recorded by the animal behavior recording unit may be used for predicting a point in time of at least one of disease, estrus, calving, fall, growth, or weaning of the animal.

The animal behavior information may include at least one of output data from a barometric sensor and an acoustic sensor provided on the animal or biological information acquired from the animal.

Another aspect of the present invention is an animal behavior recording method, in which an information processing device acquires animal behavior information that is information indicating behavior of an animal, acquires animal location information that is information indicating a location where the animal exists, and estimates and chronologically records behavior of the animal, based on the animal behavior information and the animal location information.

Still another aspect of the present invention is a program for causing an information processing device to execute processing including: acquiring animal behavior information that is information indicating behavior of an animal; acquiring animal location information that is information indicating a location where the animal exists; and estimating and chronologically recording the behavior of the animal, based on the animal behavior information and the animal location information.

Effects of the Invention

According to the present invention, it is possible to accurately and efficiently understand the animal behavior.

BRIEF DESCRIPTION OF THE DRAWINGS

FIG. 1 is a schematic diagram illustrating the overall configuration of an animal behavior recording system according to one embodiment of the present invention;

FIG. 2 is a block diagram illustrating an overview of the function of the animal behavior recording system according to one embodiment of the present invention;

FIG. 5 is an explanatory diagram illustrating the correspondence relationship between animal behavior and sensor data;

FIG. 6 is a diagram illustrating an example configuration of an installation location information table;

FIG. 7 is a diagram illustrating an example of the behavior record acquired by the animal behavior recording system according to one embodiment of the present invention;

FIG. 8 is a diagram illustrating an example of the behavior record acquired by the animal behavior recording system according to one embodiment of the present invention;

FIG. 9 is a diagram illustrating an example configuration of the processing target data storage unit;

FIG. 14 is a diagram illustrating an example of the evaluation of the behavior recording results according to the present embodiment.

PREFERRED MODE FOR CARRYING OUT THE INVENTION

Figure 3:
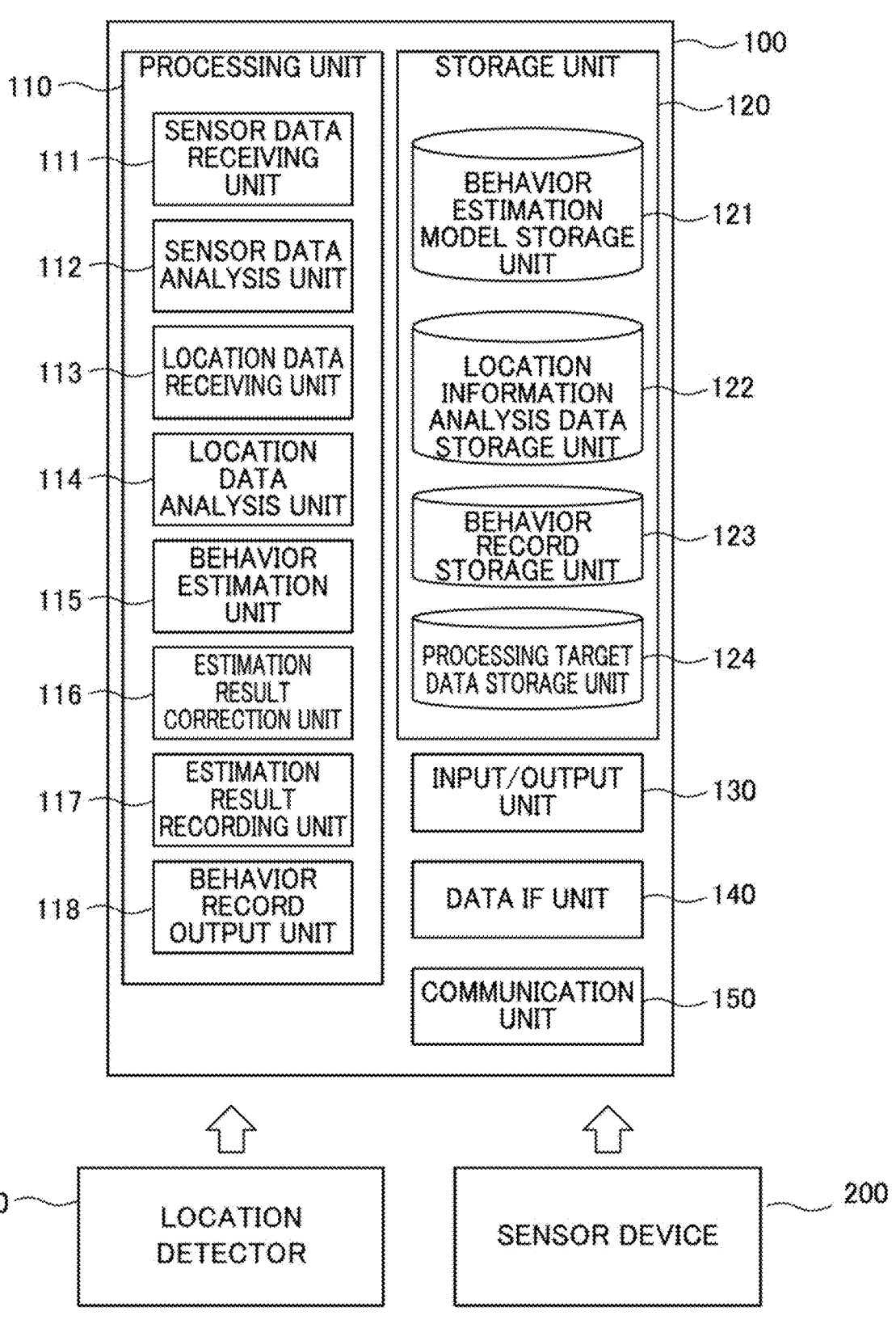
FIG. 3 is a block diagram illustrating the hardware and functional block configuration of the animal behavior recording device according to one embodiment of the present invention.

Hereinafter, the present invention will be described with reference to the accompanying drawings in accordance with the embodiments. The following embodiments are not intended to limit the present invention. The shapes, sizes, and positional relationships illustrated in each drawing are merely schematic to an extent that allows understanding of the disclosed content. In other words, the present invention is not limited to the shapes, sizes, and positional relationships illustrated in the drawings.

Embodiment

\<Animal Behavior Recording System 1\>

Figure 1:
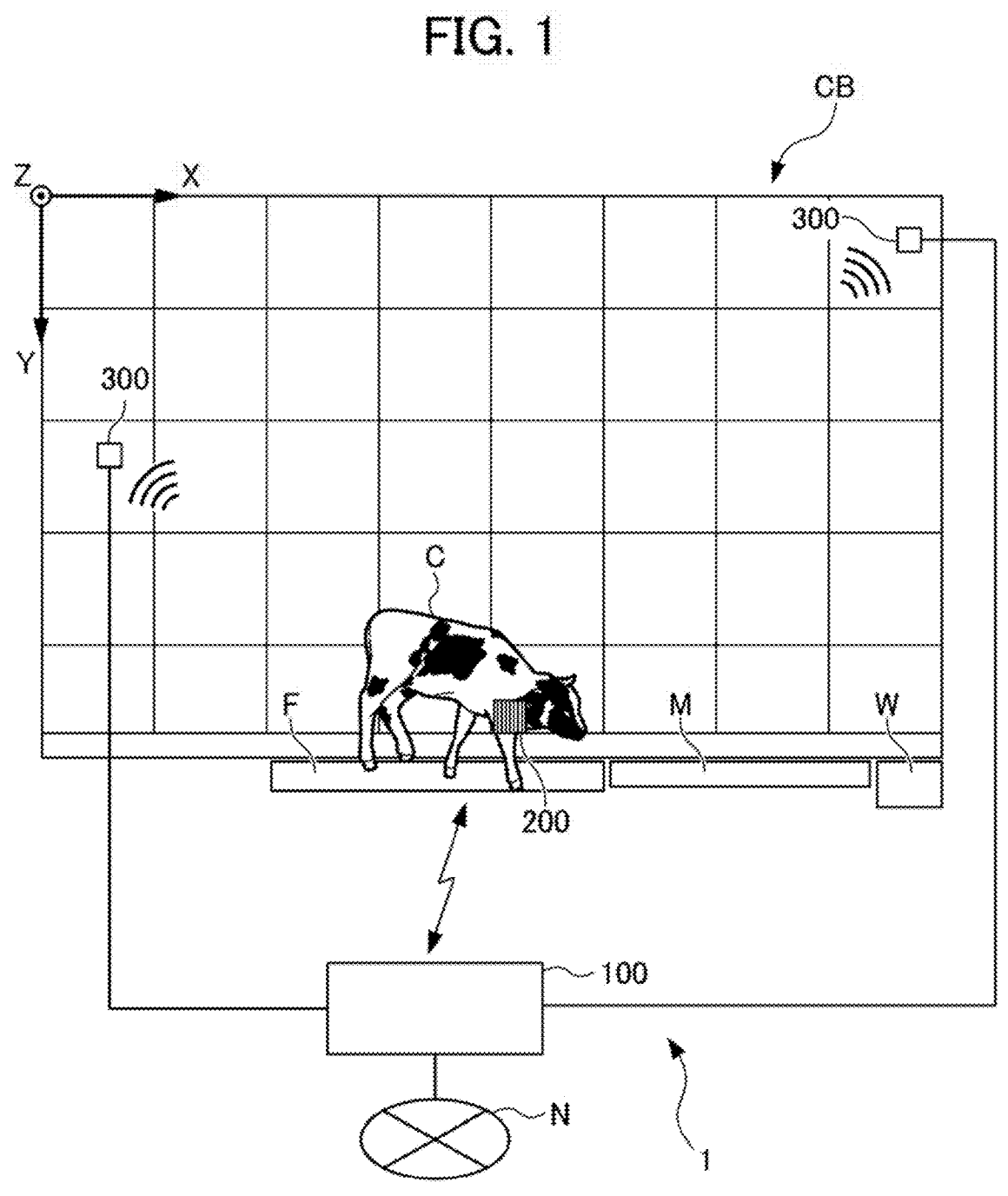

FIG. 1 is a schematic diagram illustrating the overall configuration of the animal behavior recording system 1 according to one embodiment of the present invention. As illustrated in FIG. 1, the animal behavior recording system 1 of the present embodiment includes the function of chronologically recording the behavior of a cow C being bred by a dairy farmer. The animals to be recorded are not limited to cows C but may include all animals that fall into the category of industrial animals such as pigs, sheep, horses, and goats, as well as animals being bred in zoos and so-called companion animals, which are beneficial for acquiring and utilizing behavior records.

FIG. 1 is a plan view schematically illustrating a single rectangular cattle barn CB arranged in a cowhouse. For simplicity, FIG. 1 illustrates a situation where one cow C is being bred within the cattle barn CB, but typically a plurality of cows C are being bred within a single cattle barn CB.

Installations such as a feeding area F, a milk-feeding area M, and a water-drinking area W are provided at appropriate places in the cattle barn CB, and the cow C can feed (feeding motion), suckle (suckling motion), and drink water (water-drinking motion) at the respective places. The arrangement of the feeding area F, the milk-feeding area M, and the water-drinking area W within the cattle barn CB is not limited to the example illustrated in FIG. 1 and can be appropriately determined.

A sensor device 200, including a three-axis accelerometer and a three-axis angular velocity sensor, is attached to the cow C, thereby acquiring acceleration data and angular velocity data reflecting the movement and the body motion of the cow C. The sensor device 200 includes a data transmission function, and the acquired acceleration data and angular velocity data are transmitted, for example, by near field communication (NFC). The data acquired and transmitted may be either acceleration data or angular velocity data alone.

An animal behavior recording device 100, which is an information processing device that implements the main function of animal behavior recording in the present embodiment, is installed in the vicinity of the cowhouse including the cattle barn CB, for example, in a management building of a dairy farm. The animal behavior recording device 100 receives acceleration data and angular velocity data from the sensor device 200 attached to the cow C, and analyzes the behavior of the cow C, based on the received data.

The cattle barn CB is provided with location detectors 300, which receive radio waves transmitted from sensor device 200 and generate data for the animal appearance determination device 100 to analyze the location of the transmitting sensor device 200, i.e., the location of the cow C within the cattle barn CB. In the example illustrated in FIG. 1, two location detectors 300 are installed at appropriate places within the cattle barn CB, detect the angle of the radio waves arriving from the sensor device 200, and transmit this information to the animal behavior recording device 100. The animal behavior recording device 100 uses the angle data from each location detector 300 to analyze and acquire the location of the cow C within the cattle barn CB. The animal behavior recording device 100 identifies and chronologically records the behavior of the cow C within the cattle barn CB, based on the acquired data on the cow C, i.e., the acceleration data, the angular velocity data, and the location information on the cow C within the cattle barn CB. As illustrated in FIG. 1, the X-axis and the Y-axis defining the plane coordinate system, and the Z-axis orthogonal thereto can be conveniently set within the cattle barn CB. The animal behavior recording device 100 may be configured to be communicable with external communication networks N such as the internet, WAN, or LAN. The configuration and function of the animal behavior recording device 100, the sensor device 200, and the location detector 300 will be described later with reference to the relevant drawings.

Figure 2:
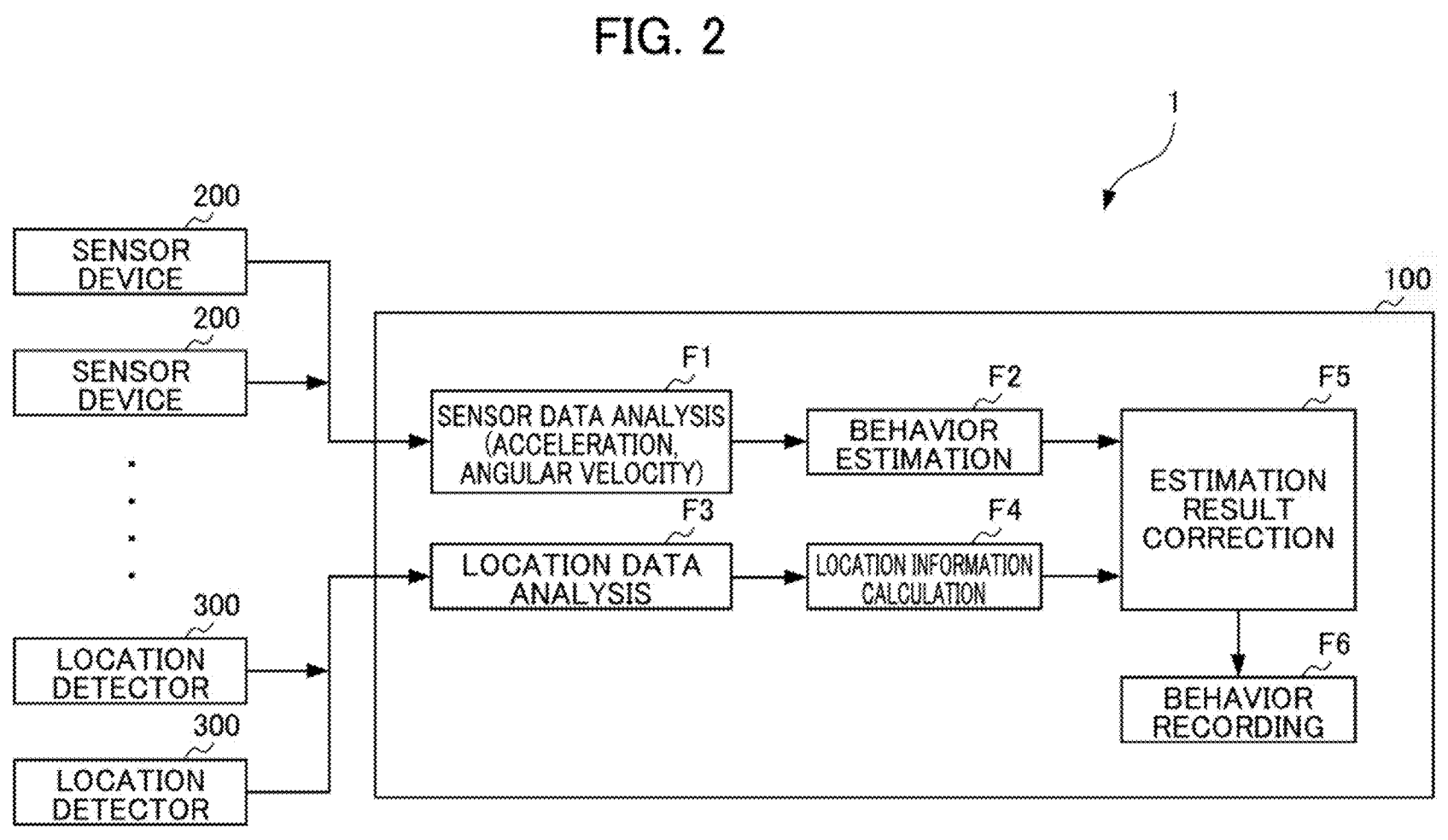

FIG. 2 illustrates the schematic configuration and function of the animal behavior recording system 1 illustrated in FIG. 1. The animal behavior recording system 1 of the present embodiment includes the animal behavior recording device 100. The animal behavior recording device 100 receives the sensor data from the sensor device 200 attached to the cow C, and the radio wave arrival angle data from the sensor device 200 received from the location detector 300 installed within the cattle barn CB. The animal behavior recording device 100 analyzes the received sensor data, specifically the three-axis acceleration data and the three-axis angular velocity data, by way of the sensor data analysis function F1, and chronologically estimates the behavior of the cow C, based on the analysis results by way of the behavior estimation function F2.

On the other hand, the animal behavior recording device 100 calculates the location information on the cow C within the cattle barn CB, based on the radio wave arrival angle data and the installation locations of the location detectors 300 by way of the location data analysis function F3 and the location information calculation function F4. The estimation result correction function F5 of the animal behavior recording device 100 executes correction processing to enhance the accuracy of the estimated behavior, based on the processing results of the behavior estimation function F2 and the location information calculation function F4. The behavior recording function F6 chronologically records the corrected behavior records. As will be described later, the behavior of the cow C may be estimated based on the location information, and the estimation results may be corrected based on the analysis results of the sensor data.

<Animal Behavior Recording Device 100, Sensor Device 200, Location Detector 300>

Figure 4:
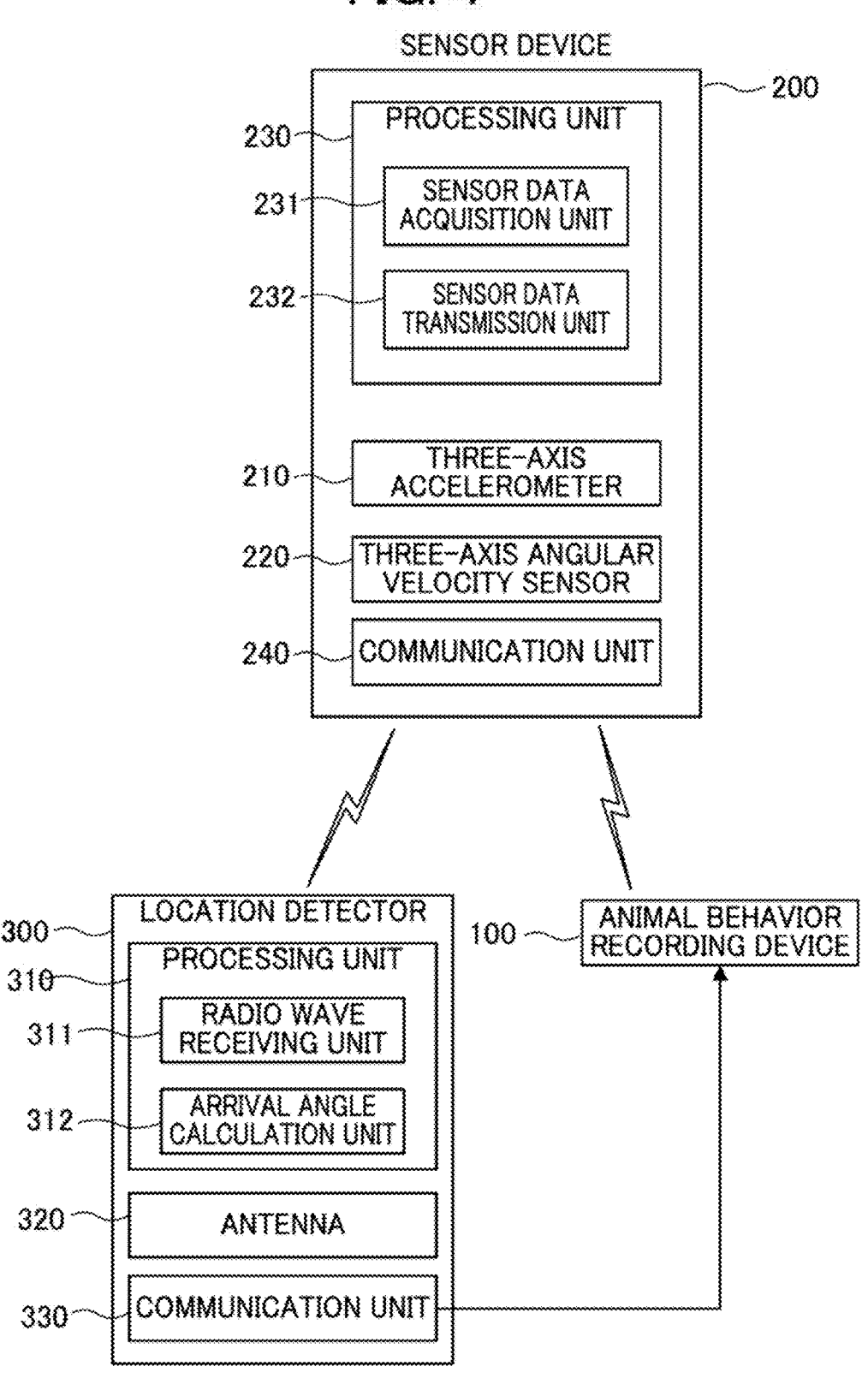
FIG. 4 is a block diagram illustrating the hardware and functional block configuration of the sensor device and the location detector according to one embodiment of the present invention.

Next, the configurations and function of the animal behavior recording device 100, the sensor device 200, and the location detector 300 in the present embodiment will be specifically described. FIGS. 3 and 4 are block diagrams illustrating the hardware and functional block configurations of the animal behavior recording device 100, the sensor device 200, and the location detector 300 according to one embodiment of the present invention.

<Sensor Device 200, Location Detector 300>

First, the sensor device 200 and the location detector 300 in the present embodiment will be described with reference to FIG. 4. The sensor device 200 is attached to an appropriate part of the body of the cow C, and converts the movements and the body part motions of the cow C, which are included in the behavior of the cow C, into physical quantities, and outputs the physical quantities. In the present embodiment, the sensor device 200 is, for example, fixed to the collar attached to the neck of the cow C, but may be attached to other parts such as the ear. Information representing the movements such as walking, the motions involved with various motions such as standing up, and the body part motions involved with head shaking and rumination of the cow C, can be comprehensively recognized as animal behavior information.

As illustrated in FIG. 4, the sensor device 200 includes a three-axis accelerometer 210, a three-axis angular velocity sensor 220, a processing unit 230, and a communication unit 240. The three-axis accelerometer 210 and the three-axis angular velocity sensor 220 are the sensors for measuring the acceleration in the three (x, y, and z) axis directions and the angular velocity around the three (x, y, and z) axes, and are capable of acquiring acceleration in each axis direction and angular velocity around each axis, respectively, as output voltage signals, for example. The processing unit 230 includes: a sensor data acquisition unit 231 that receives output signals from the three-axis accelerometer 210 and the three-axis angular velocity sensor 220, executes predetermined processing such as AD conversion to convert the received signals into digital data; and a sensor data transmission unit 232 that externally transmits the three-axis acceleration digital data and three-axis angular velocity digital data generated by the sensor data acquisition unit 231. The processing unit 230 includes: an AD conversion circuit that receives analog signals from the accelerometer 210 and the angular velocity sensor 220, and converts the received analog signals into digital signals; and the sensor data transmission unit 232 that converts the AD-converted digital data into a predetermined format and transmits the converted data. The sensor data acquisition unit 231 and the sensor data transmission unit 232 are controlled by a processor such as a CPU. Modular devices including various conversion circuits for sensor output signals can be appropriately used as the accelerometer and the angular velocity sensor.

The communication unit 240 receives digital data representing sensor output signals from the sensor data transmission unit 232 of the processing unit 230, and wirelessly transmits the data using a predetermined communication method. In the present embodiment, the communication unit 240 is configured as a communication module including the function conforming to Bluetooth (registered trademark). The digital data from the sensor data transmission unit 232 transmitted from the communication unit 240 is transmitted as Bluetooth data packets, and received by the animal behavior recording device 100. The Bluetooth data packets are also received by the location detectors 300 installed in the cattle barn CB. The above communication method is merely an example and is not limited to this.

The location detector 300 functions as a locator to utilize the direction-finding feature included in Bluetooth 5.1. As illustrated in FIG. 4, the location detector 300 can be configured to include a processing unit 310 composed of a processor, etc., an antenna array 320, and a communication unit 330. The processing unit 310 can include a radio wave receiving unit 311 and an arrival angle calculation unit 312 as functional blocks. In Bluetooth 5.1, the arrival angle of Bluetooth signals can be acquired using the angle of arrival (AoA) of the radio wave. The digital signal of Bluetooth 5.1 after regular data communication includes a monotone sine wave of constant duration, which is referred to as Constant Tone Extension (CTE). The location detector 300 includes the function of receiving the CTE by the radio wave receiving unit 311 via the antenna array 320 including the plurality of antennas, and calculating the entry angle of the Bluetooth signal, based on the difference in phase angle of the waves received at each antenna, in the arrival angle calculation unit

312. As will be described later, the arrival angle data calculated by the arrival angle calculation unit 312 of the location detector 300 is transmitted to the animal behavior recording device 100 via the communication unit 330. The location detection method for detecting the location of the sensor device 200 is not limited to a method using the Bluetooth function and can adopt other available methods, such as a location detection methods using GPS or satellite positioning systems or location identification methods based on the images capturing the cow C within the cattle barn CB.

<Animal Behavior Recording Device 100>

Next, the animal behavior recording device 100 will be described. As illustrated in FIG. 3, the animal behavior recording device 100 is an information processing device such as a server computer or a personal computer, and includes a processing unit 110, a storage unit 120, an input/output unit 130, a data interface (data IF) unit 140, and a communication unit 150. The processing unit 110, the storage unit 120, the input/output unit 130, the data IF unit 140, and the communication unit 150 are mutually connected by an internal communication bus (not illustrated).

The processing unit 110 is a computing device composed of a processor such as a CPU that reads and executes various programs and data from the storage unit 120 (described later) to implement the function of the animal behavior recording device 100. In the present embodiment, the processing unit 110 executes data processing for each functional unit, including a sensor data receiving unit 111, a sensor data analysis unit 112, a location data receiving unit 113, a location data analysis unit 114, a behavior estimation unit 115, an estimation result correction unit 116, an estimation result recording unit 117, and a behavior record output unit 118. The operations of each functional unit will be described later.

The storage unit 120 is a storage area for various programs and data to enable the hardware components to function as the animal behavior recording device 100, and can be composed of ROM, RAM, flash memory, solid-state drives (SSD), or hard disk drives (HDD). Specifically, the storage unit 120 stores programs for causing the processing unit 110 (control programs for the animal behavior recording device 100) to execute the functions of the present embodiment, various parameters, data used for behavior estimation, data related to the cow C as the processing target, operation input data input from external sources, and generated behavior record data.

The input/output unit 130 is composed of various input devices such as a keyboard, a mouse, a touch panel, and a microphone, which allow data to be input into the animal behavior recording device 100 from external sources, and output devices such as a monitor display and speakers which display and output behavior record data, etc.

The data IF unit 140 includes the function of controlling data communication between the processing unit 110, the storage unit 120, the input/output unit 130, and the communication unit 150.

The communication unit 150 is a communication module that transmits and receives various data with the sensor device 200 and the location detector 300, and is configured as hardware such as a network interface card (NIC). The communication unit 150 can also be used by the animal behavior recording device 100 to communicate with the external communication networks N, as illustrated in FIG. 1.

Next, the function of the animal behavior recording device 100 will be described, which are implemented by the programs executed by the processing unit 110.

The sensor data receiving unit 111 includes the function of receiving sensor data acquired from the sensors provided in the sensor device 200 attached to the cow C. In the present embodiment, the sensor data is received every 0.2 to 10 seconds, but the time interval is not limited. Here, the sensor data refers to digital data acquired based on output signals from the three-axis accelerometer and the three-axis angular velocity sensor provided in the sensor device 200.

The sensor data analysis unit 112 includes the function of extracting a length required to estimate the behavior and motions of the cow C, based on the three-axis accelerometer data ($\alpha x$, $\alpha y$, $\alpha z$) and the three-axis angular velocity sensor data ($\omega x$, $\omega y$, $\omega z$) received during the 0.2 to 10 seconds period from the sensor device 200 attached to the cow C. As described above, the data acquired from the sensor device 200 may be the three-axis acceleration data and/or the three-axis angular velocity data. Image data of the cow C captured by a camera, barometric data near the sensor device 200 attached to the cow C, acoustic data recorded around the cow C, and biometric information such as body temperature, heart rate, respiratory rate, and blood pressure of the cow C can be appropriately used as the sensor data.

The location data receiving unit 113 includes the function of receiving location data from the location detector 300. As described above, the location data includes, for example, the position coordinates of the location detectors 300 within the cattle barn CB, and the radio wave arrival angle data from the sensor device 200 calculated by the arrival angle calculation unit 312 of the location detectors 300. The position coordinates data of the location detectors 300 may be stored in advance as parameters in the storage unit 120.

The location data analysis unit 114 calculates the location of the sensor device 200 within the cattle barn CB using the position coordinates data and the radio wave reception angle of the location detectors 300 received and acquired by the location data receiving unit 113. As illustrated in FIG. 1, when two sets of location detectors 300 are used, the location of the sensor device 200, which is the source of the radio waves, can be determined as the intersection of two straight lines drawn from the two location detectors 300 at the arrival angles of the radio waves, respectively. Additional location detectors 300 can be installed, depending on the required accuracy in measuring the location of the sensor device 200. By matching the acquired location of the sensor devices 200 with the pre-set plane coordinates within the cattle barn CB, it is possible to determine where in the cattle barn CB the cow C stays, to which the sensor device 200 is attached. The above-mentioned location detection method for the sensor device 200 is an example, and other methods may also be used, such as calculating the position coordinates based on GPS (Global Positioning System) satellite signals or utilizing radio waves from mobile communication base stations.

The behavior estimation unit 115 includes the function of estimating the behavior of the cow C, based on the sensor data acquired by the sensor data analysis unit 112 (in the present embodiment, the three-axis accelerometer data and the three-axis angular velocity data measured by the sensor device 200) or the location information on the sensor device 200 within the cattle barn CB acquired by the location data analysis unit 114.

<Behavior Estimation Based on Sensor Data>

In the present embodiment, when the behavior of the cow C is estimated based on the sensor data, a trained model created by using training data is used, which associates the data set including the sensor data with the behavior of the cow C at the time of acquiring the sensor data. In the present embodiment, this trained model is stored in the behavior estimation model storage unit 121 of the storage unit 120. FIG. 5 illustrates an example configuration of the training data used in the behavior estimation processing. The training data illustrated in FIG. 5 is schematic, and each of the acceleration and the angular velocity corresponding to each behavior type is a set of plurality values of acceleration and angular velocity acquired within a certain period of time, instead of a set of single values for each behavior type. In other words, what corresponds to each behavior type can be described as a set of values of acceleration and angular velocity which serve as the basis for identifying that behavior type. The training data illustrated in FIG. 5 classifies the behavior of the cow C, as determined based on the sensor data, into twelve behavior types: "drinking water", "feeding (artificial milk)", "feeding (hay)", "rumination", "suckling", "head shaking", "moving (walking)", "moving (running)", "standing motion", "lying down motion", "coughing", and "lying down state/standing state". Each behavior type corresponds to a set of three-axis acceleration data and three-axis angular velocity data. The training data can be created by labeling the behavior types based on the video image data recording the behavior of the cow C and the sensor data acquired corresponding to the video image data. In the present embodiment, a neural network using "Long Short-Term Memory (LSTM)" is employed as the specific machine learning architecture. However, other machine learning methods or rule-based determination processing may also be used. For example, a set of past values of acceleration data and angular velocity data corresponding to each behavior type may be created as their statistical correspondence relationship, and the newly acquired sensor data may be compared with such a set to estimate the behavior type.

<Behavior Estimation Based on Location Information>

The behavior estimation of the cow C can also be executed based on the location information of the cow C within the cattle barn CB. The location data analysis unit 114 of the animal behavior recording device 100 can determine the location of the sensor device 200 within the cattle barn CB, that is, where in the cattle barn CB the cow C stays, based on the location data from the location detectors 300 installed in the cattle barn CB. For example, when the location information of the cow C indicates that the cow C stays at the "feeding area", "milk-feeding area", or "water-drinking area" within the cattle barn CB, the cow C can be estimated to be engaged in the behavior of "feeding", "suckling", or "water-drinking". Since the temporal change in the location information of the cow C can be detected, whether the cow C is engaged in the behavior such as "moving (walking)", "moving (running)", or "lying down state/standing state" can be determined based on the presence or absence of a change in the location information as well as the speed of such a change. The data used for estimating the behavior based on the location information is stored in the location information analysis data storage unit 122 of the storage unit 120. The location information analysis data includes planar position coordinates indicating the ranges of the "feeding area", "milk-feeding area", and "water-drinking area", which are used for determining where in the cattle barn CB the cow C stays. FIG. 6 illustrates an example configuration of the installation location information table that indicates installation locations of the various installations within the cattle barn CB. The installation location information table 1221 illustrated in FIG. 6 is stored in the location information analysis data storage unit 122, and contains information associating the types of installations with the location information indicating the locations within the cattle barn CB. For example, in the example illustrated in FIG. 6, the location of the "feeding area F" within the cattle barn CB is indicated by the location information (X11 to X12, Y11 to Y12). This indicates that the feeding area F is located within the region defined by the four position coordinates (X11, Y11), (X11, Y12), (X12, Y11), and (X12, Y12) within the cattle barn CB. By comparing the location data transmitted from the sensor device 200 attached to the cow C with the installation location information recorded in the installation location information table 1222, the behavior estimation unit 115 can determine whether the cow C stays near any of the installations. For example, if the cow C is determined as staying near the feeding area F, the cow C is estimated to be engaged in the feeding behavior. The installation location information table 1221 can prerecord the installations or specific places within the cattle barn CB, which are considered to improve the accuracy in estimating the behavior estimation of the cow C, without limitation to the example installations illustrated above.

The estimation result correction unit 116 includes the function of correcting the behavior types of the cow C, which were estimated by the behavior estimation unit 115, by incorporating estimation results from different perspectives. As described above, in the present embodiment, the behavior estimation unit 115 is configured to chronologically estimate the behavior types of the cow C, based on the three-axis acceleration data and the three-axis angular velocity data acquired from the sensor device 200 attached to the cow C, or the location information on the cow C based on the location data acquired from the location detectors 300 installed in the cattle barn CB. The estimation result correction unit 116 uses different estimation logic to correct the behavior types of the cow C estimated based on the sensor data or the location information. In the present embodiment, the estimation result correction unit 116 uses the location information to verify and correct the behavior types of the cow C estimated based on the sensor data, and uses the sensor data to verify and correct the behavior types of the cow C estimated based on the location information. This processing of correcting the behavior estimation results improves the accuracy in estimating the behavior types of the cow C. Additional perspectives may be introduced into the correction processing by the estimation result correction unit 116. For example, regarding the chronologically recorded estimation results of behavior types, in a case where a behavior type "feeding" is continuously recorded, and only one point of "moving (walking)" is recorded in between, the "moving (walking)" entry can be considered noise due to the lack of continuity with the surrounding behavior types. Correction of the behavior estimation results can be verified from the perspective of continuity of the recorded behavior types in this manner.

The estimation result recording unit 117 includes the function of chronologically recording the corrected behavior type estimation results acquired by the estimation result correction unit 116. The corrected behavior type estimation results are chronologically stored in the behavior record storage unit 123 of the storage unit 120. Example configurations of the behavior record storage unit 123 are illustrated in FIGS. 7 and 8. FIG. 7 illustrates an example where behavior estimation is executed based on acceleration data and angular velocity data, and the behavior estimation results are corrected using the location information. FIG. 8 illustrates an example where behavior estimation is executed based on the location information, and the behavior estimation results are corrected using the acceleration data and the angular velocity data. In the example illustrated in FIG. 7, the recording date and time, the acceleration data and the angular velocity data at that time, and the behavior type estimated based on this data are recorded in association with the individual ID which is the identification code assigned to each cow C. Each record contains the location of the cow C within the cattle barn CB acquired at the corresponding date and time, the stay location of the cow C estimated based on this data, and the behavior type corrected based on the location information. Referring to the first record of the cow C with the individual ID "001" in FIG. 7, the behavior type estimated from the acceleration data and the angular velocity data is recorded as "feeding", which aligns with the stay location of the cow C at the "feeding area" estimated from the location of the cow C, thus the corrected behavior type is also recorded as "feeding". In contrast, referring to the third record, while the behavior type estimated based on the acceleration data and the angular velocity data is "suckling", the stay location estimated based on the location is the "feeding area", which does not align with the estimated behavior type. In this case, in the present embodiment, the "feeding area" as the stay location estimated based on the location is prioritized, thus the behavior type is corrected to "feeding". On the other hand, in the example illustrated in FIG. 8, the individual ID as the identification code assigned to each cow C is recorded in association with the date and time of the record, the location information at that time, the stay location estimated based on that location information, and whether the cow was moving. Each record contains the acceleration data and the angular velocity data of the cow C acquired at the corresponding date and time, the behavior type estimated based on this data, and the corrected behavior type. Referring to the first record of the cow C with the individual ID "001" in FIG. 8, the record of the location information shows that the cow C stays at the "feeding area" and is "not moving", which aligns with the behavior type "feeding" estimated based on the acceleration data and the angular velocity data, thus the corrected behavior type is also recorded as "feeding". In contrast, referring to the fourth record, while the stay location estimated based on the location information is "water-drinking area" with "no" movement, the behavior type estimated based on the acceleration data and the angular velocity data is "standing state". In this case, since the cow C is considered staying at the water-drinking area doing nothing actually, the estimated behavior type after correction is recorded as "resting". The categories of animal behavior types and the policies for correcting behavior types can vary depending on the target animal and the purpose of behavior recording, thus the configuration of the behavior record storage unit 123 can be freely changed accordingly.

The behavior record output unit 118 reads the animal behavior records stored in the behavior record storage unit 123 in accordance with input operations from the input/output unit 130 and executes output processing such as displaying the records on a display.

The processing target data storage unit 124 stores individual information on the individual cows C as the target of behavior recording. FIG. 9 illustrates an example configuration of the processing target data storage unit 124. The processing target data storage unit 124 illustrated in FIG. 9 records a sensor device ID as a unique identification code of each sensor device 200, a breed of the cow indicating the type of cow, gender, age, health conditions, and medical history, in association with the individual ID as the identification code assigned to each cow C that is the target of behavior recording. The sensor device ID is included in the sensor data transmitted from each sensor device 200 attached to the cow C to the animal behavior recording device 100, allowing the received sensor data to be identified as originating from which sensor device 200. The sensor device ID is also received by the location detector 300, allowing the location of the specific sensor device 200 to be associated with the sensor device ID. The health conditions are recorded as evaluation scores as illustrated, or may be recorded in specific text. The medical history may be recorded in an appropriate description format. The recording items for the processing target data storage unit 124 are not limited to the example in FIG. 9 and can be determined as appropriate.

<Data Processing by Animal Behavior Recording Device 100>

Next, the data processing executed by the animal behavior recording device 100 in the present embodiment will be described. The animal behavior recording device 100 mainly executes the behavior estimation processing and the behavior estimation result correction processing.

<Behavior Estimation Processing Based on Sensor Data>

Figure 10:
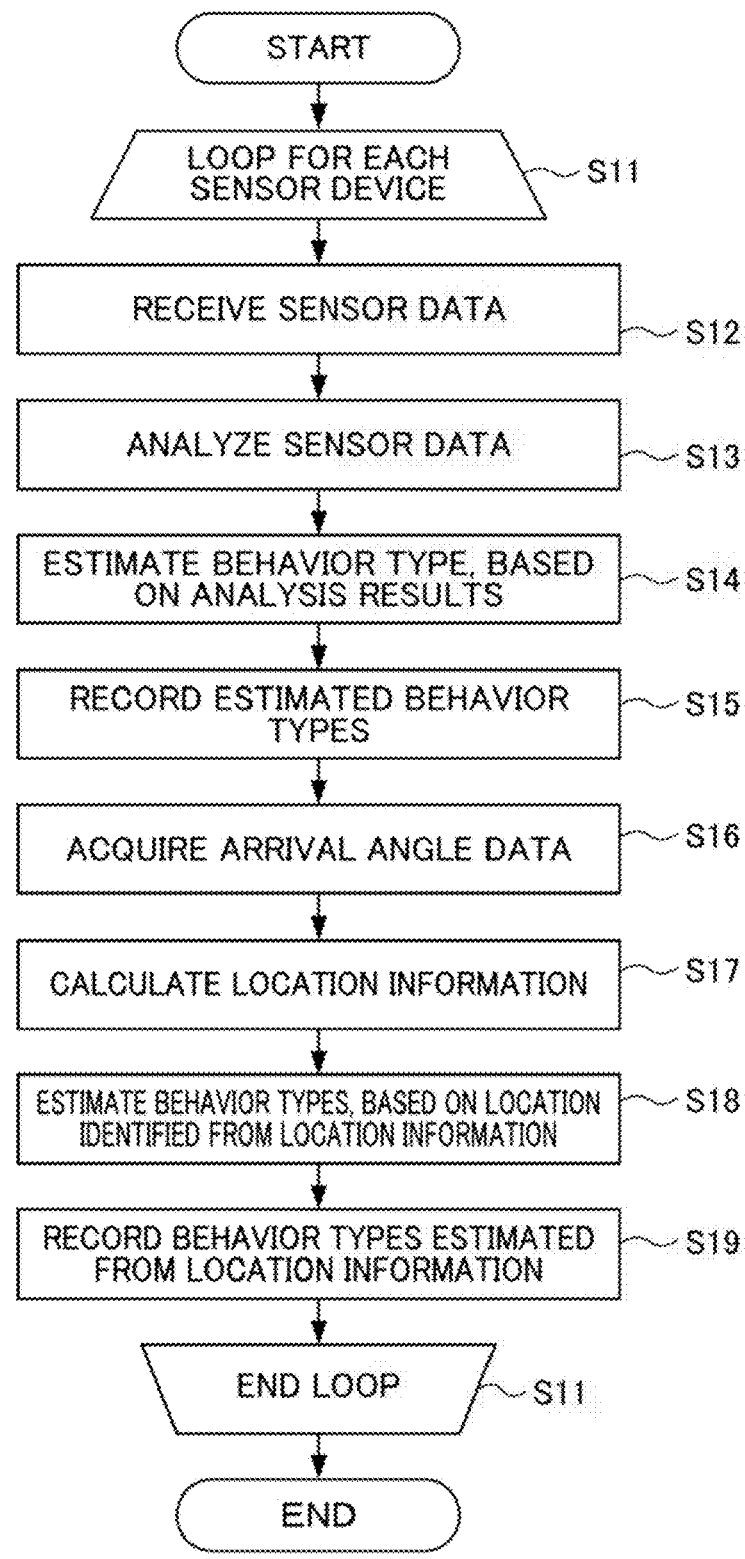
FIG. 10 is a flowchart illustrating an example of the behavior estimation processing executed by the animal behavior recording device according to one embodiment of the present invention.

FIG. 10 is a flowchart illustrating an example of the processing flow of the behavior estimation processing executed by the animal behavior recording device 100 in the present embodiment. The behavior estimation processing starts, for example, upon power-on and startup of the animal behavior recording device 100.

The behavior estimation processing illustrated in FIG. 10 is executed at predetermined time intervals for each cow C being bred within the cattle barn CB, specifically for the sensor device 200 attached to each cow C (loop of Step S11).

The sensor data receiving unit 111 of the animal behavior recording device 100 receives sensor data of the three-axis accelerometer and the three-axis angular velocity sensor from the sensor device 200 attached to the cow C (Step S12).

The sensor data analysis unit 112 calculates three-axis acceleration data and three-axis angular velocity data, based on the sensor data received from the three-axis accelerometer and the three-axis angular velocity sensor (Step S13).

The behavior estimation unit 115 acquires the results of estimating the behavior types by applying a trained model, which has been pre-trained with the correspondence relationship between the behavior types of the cow C and the three-axis acceleration data and three-axis angular velocity data, to the three-axis acceleration data and the three-axis angular velocity data acquired in Step S13 (Step S14).

The behavior estimation unit 115 stores the behavior types, as estimated in Step S14, in the behavior record storage unit 123 of the storage unit 120 (Step S15).

The location data receiving unit 113 receives the planar position coordinates of the location detectors 300 and the radio wave arrival angles from the sensor device 200 received by the location detectors 300, from the location detectors 300 installed in the cattle barn CB (Step S16).

The location data analysis unit 114 calculates the location of the sensor device 200 within the cattle barn CB, as the location information indicating the place where the cow C stays, based on the position coordinates and the radio wave arrival angle of the location detectors 300 received from the location detectors 300 (Step S17)

The behavior estimation unit 115 estimates the behavior types of the cow C, based on the location information calculated in Step S17 (Step S18).

The behavior estimation unit 115 stores the location information and the behavior types estimated in Step S18 in the behavior record storage unit 123 (Step S19). As described above, the processing is repeatedly executed at predetermined time intervals for each cow C while the animal behavior recording device 100 is in operation, thereby accumulating behavior records for each cow C.

<Behavior Estimation Result Correction Processing>

Figure 11:
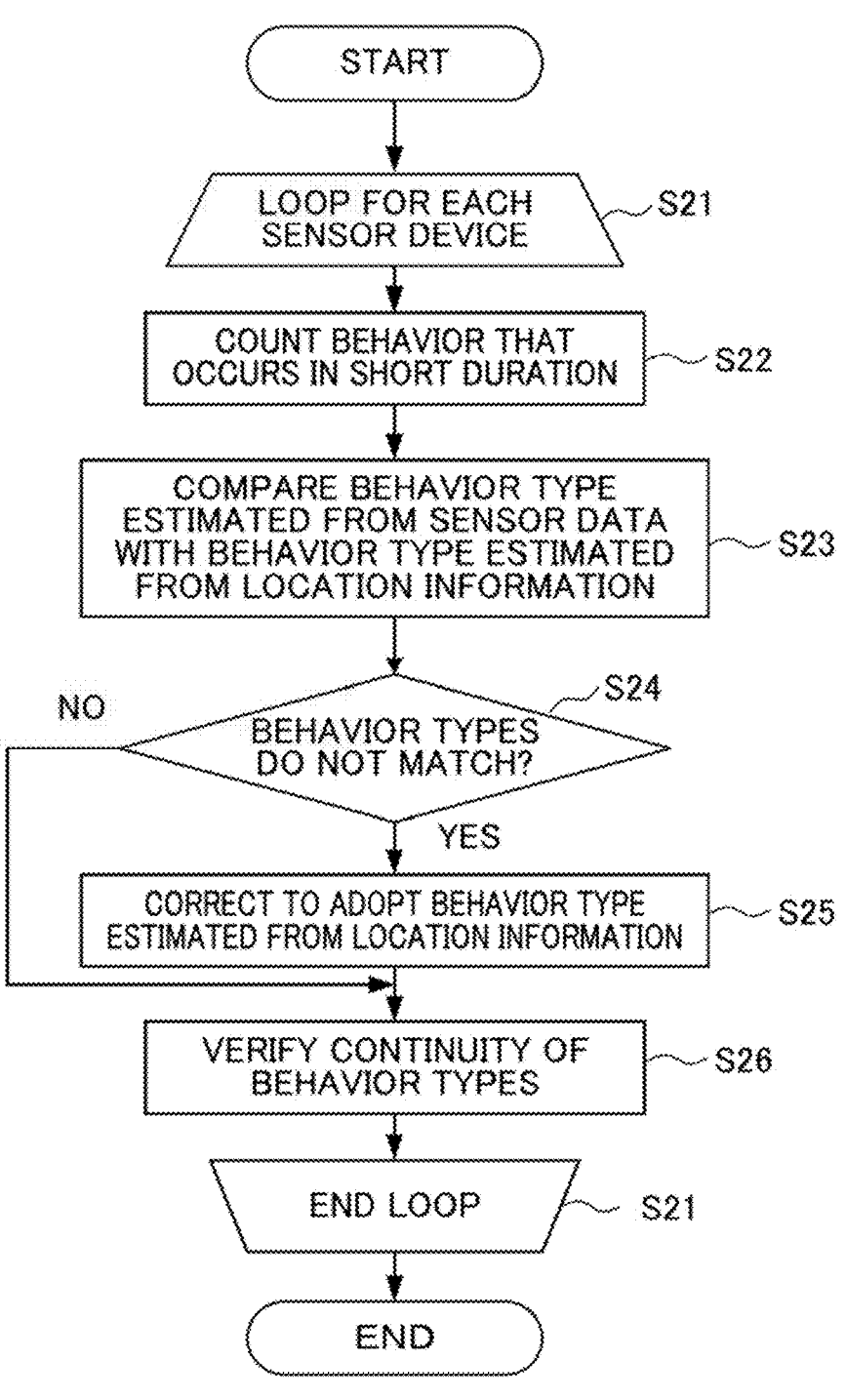
FIG. 11 is a flowchart illustrating an example of the behavior estimation correction processing executed by the animal behavior recording device according to one embodiment of the present invention.

Next, the behavior estimation result correction processing of correcting the behavior types of the cow C estimated by the behavior estimation unit 115 will be described. FIG. 11 is a flowchart illustrating an example of the processing flow of the behavior estimation result correction processing. Similar to the behavior estimation processing, the behavior estimation result correction processing illustrated in FIG. 11 starts upon power-on and startup of the animal behavior recording device 100, and continues to be executed while the animal behavior recording device 100 is in operation.

The animal behavior recording device 100 executes the loop processing from Step S21 at regular time intervals for each cow C within the cattle barn CB. In the present embodiment, this time interval is set to one hour.

The estimation result correction unit 116 first counts the number of behavior types, which occur in very short duration and are recorded in the past one hour, specifically the number of "coughing" and "moving (running)" (Step S22). This counting is to prevent such events from being erroneously classified as noise due to verification of continuity of behavior types, which will be described later.

The estimation result correction unit 116 compares the behavior type estimated from the sensor data with the behavior type estimated from the location information by using the timestamps of each record in the behavior record storage unit 123 as keys (Step S23). If the two behavior types are determined as disagreeing (Step S24: YES), the estimation result correction unit 116 executes correction to adopt the behavior type estimated from the location information as the estimation result (Step S25). If the two behavior types are determined as not disagreeing (Step S24: NO), the processing proceeds to Step S26.

The estimation result correction unit 116 of the animal behavior recording device 100 verifies the continuity of the corrected estimation results recorded in the behavior record storage unit 123. Specifically, the estimation result correction unit 116 refers to the corrected estimation results of the behavior types recorded in the behavior record storage unit 123 over the past one hour, checks for any items with no continuity in the recorded behavior types, and makes corrections to ensure continuity. An example correction to ensure continuity is the case where another behavior type such as "moving (walking)" is recorded in the middle of a continuous recording of "feeding (hay)" for certain duration. In this case, the record of "moving (walking)" is corrected to "feeding (hay)", from the perspective of continuity.

As described above, the processing is repeatedly executed at regular intervals of, for example, every hour, for each cow C while the animal behavior recording device 100 is in operation. In a case where the estimated behavior types contain defects from the perspective of continuity, such defects may be corrected by correcting the estimation results using the location information. Considering such circumstances, verification of behavior types from the perspective of continuity can be omitted.

<Animal Behavior Recording System According to Another Embodiment>

Next, the animal behavior recording system 1 according to another embodiment of the present invention will be described. The animal behavior recording system 1 of the present embodiment shares the same basic configuration as the embodiment already described with reference to FIGS.

1 to 11 (hereinafter sometimes conveniently referred to as the "first embodiment"). Therefore, in the present embodiment (hereinafter sometimes conveniently referred to as the "second embodiment"), the description will focus on the differences from the first embodiment.

The animal behavior recording system 1 in the second embodiment essentially includes the same configuration as described in the first embodiment with reference to FIG. 1, including the function of estimating and chronologically recording the behavior of the cow C within the cattle barn CB, based on the three-axis acceleration data and the three-axis angular velocity data from the sensor device 200 and the location data from the location detectors 300. The configurations of the animal behavior recording device 100, the sensor device 200, and the location detector 300 in the second embodiment are the same as those described in the first embodiment with reference to FIGS. 2 and 3.

<Data Processing Executed by Animal Behavior Recording Device 100 in Second Embodiment>

In the second embodiment, the processing of estimating the animal behavior and correcting the estimation results differ from those in the first embodiment. Hereinafter, the behavior estimation processing and the estimation result correction processing executed by the animal behavior recording device 100 in the second embodiment will be described. In the present embodiment, the behavior estimation processing first roughly estimates the behavior, based on the place where the cow C stays within the cattle barn CB and whether the cow C is moving, and then applies necessary corrections to this behavior estimation, based on the sensor data received from the sensor device 200. Specifically, in the present embodiment, the location data from the location detector 300 and the sensor data from the sensor device 200 regarding the cow C are recorded at relatively short time intervals. The animal behavior recording device 100 executes the behavior estimation processing and the estimation result correction processing repeatedly at longer time intervals, based on the recorded location information.

<Data Acquisition Processing>

Figure 12:
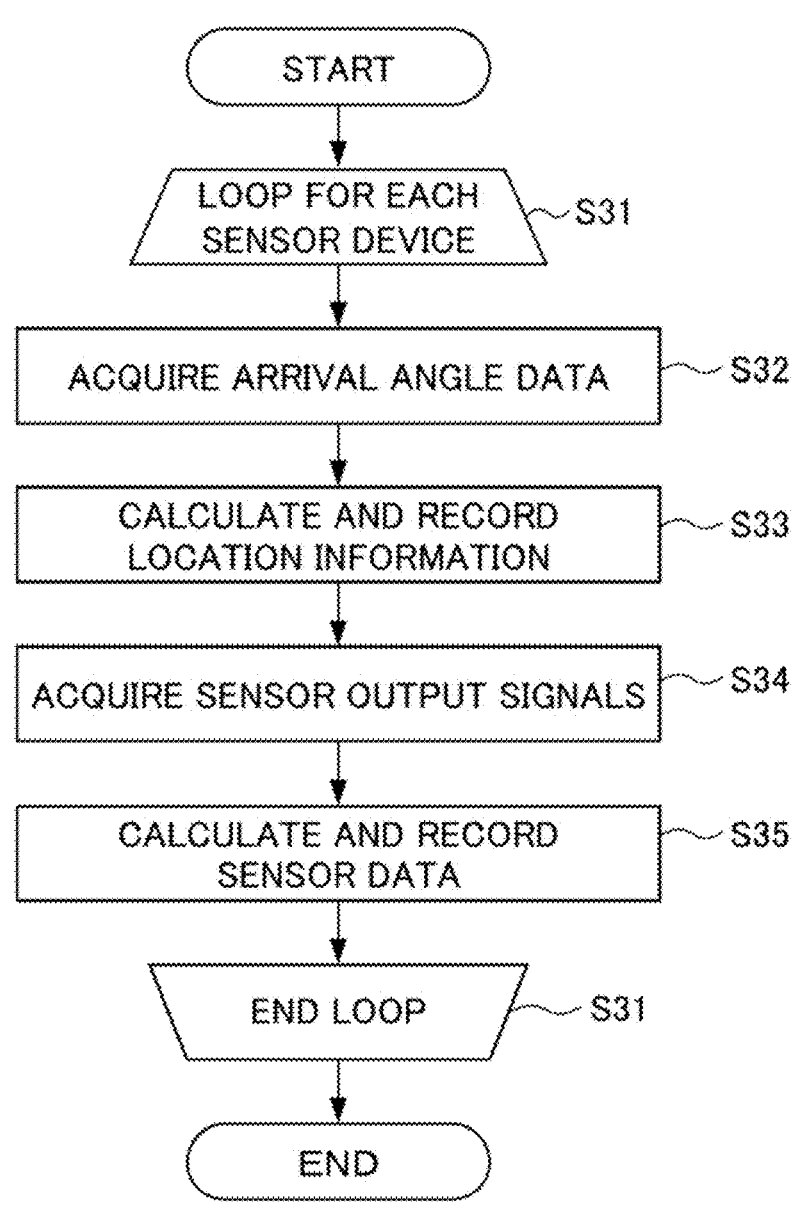
FIG. 12 is a flowchart illustrating an example of the data acquisition processing according to another embodiment of the present invention.

FIG. 12 is a flowchart illustrating an example of the processing flow of the data acquisition processing executed by the animal behavior recording device 100 in the present embodiment. This data acquisition processing starts, for example, upon power-on and startup of the animal behavior recording device 100.

The data acquisition processing illustrated in FIG. 12 is executed at regular time intervals for each cow C being bred within the cattle barn CB. Specifically, the processing in Steps S32 to S35 is executed for each sensor device 200 attached to each cow C (loop of Step S31). In the present embodiment, for example, the time interval for executing the data acquisition processing is set to about 0.01 seconds to 1 minute for each sensor device 200, but this is not limited to this interval and may be appropriately determined.

The location data receiving unit 113 receives the planar position coordinates of the location detectors 300, and the radio wave arrival angle from the sensor device 200 received by the location detectors 300, from the location detectors 300 installed in the cattle barn CB (Step S32).

The location data analysis unit 114 calculates the location of the sensor device 200 within the cattle barn CB as the location information indicating the place where the cow C stays, based on the position coordinates of the location detectors 300 and the radio wave arrival angle received at the location detectors 300, and records the data in the behavior record storage unit 123 (Step S33).

The sensor data receiving unit 111 of the animal behavior recording device 100 receives output data signals of the three-axis accelerometer and the three-axis angular velocity sensor from the sensor device 200 attached to the cow C (Step S34).

The sensor data analysis unit 112 calculates three-axis acceleration data and three-axis angular velocity data, based on the output data signals received from the three-axis accelerometer and the three-axis angular velocity sensor, and records the data in the behavior record storage unit 123 (Step S35).

The basic data for executing the animal behavior estimation processing in the second embodiment is collected through the data acquisition processing as above.

<Behavior Estimation Processing and Estimation Result Correction Processing>

Figure 13:
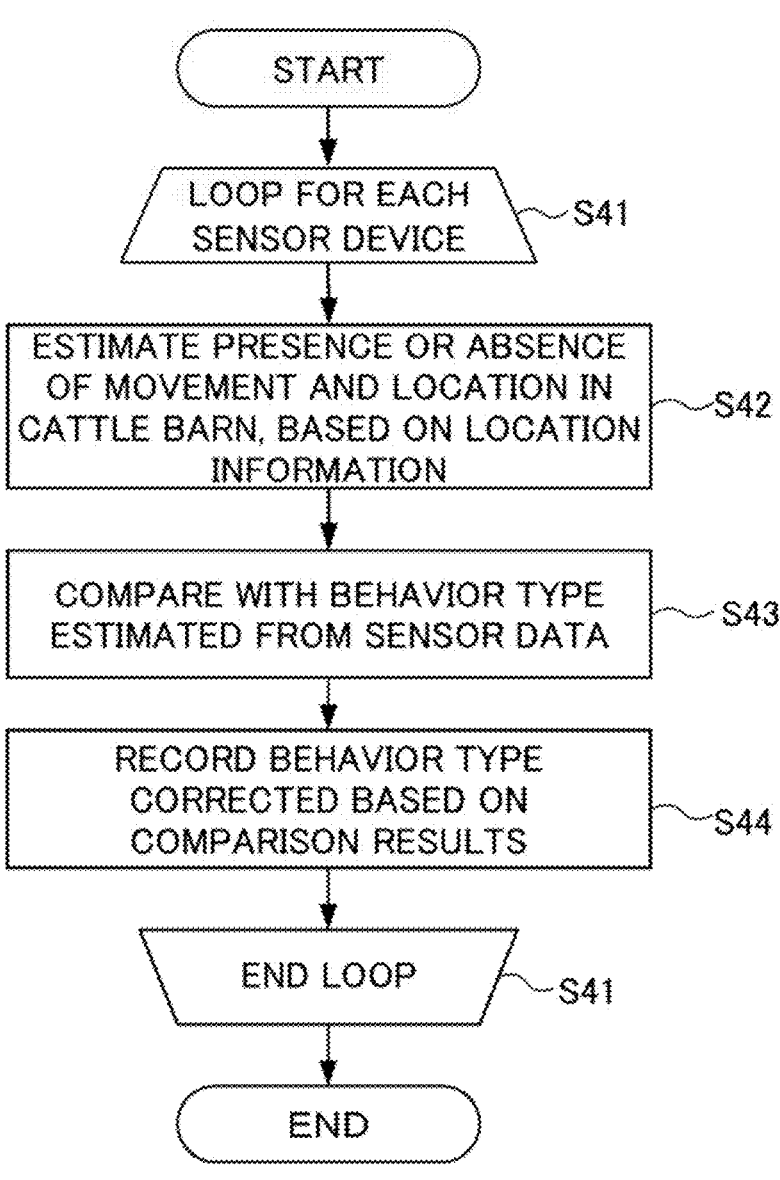
FIG. 13 is a flowchart illustrating an example of the behavior estimation processing and the estimation result correction processing according to another embodiment of the present invention.

Next, the behavior estimation processing and the estimation result correction processing executed by the animal behavior recording device 100 in the present embodiment will be described. FIG. 13 is a flowchart illustrating an example of the processing flow of the behavior estimation processing and the estimation result correction processing in the present embodiment. The behavior estimation processing and the estimation result correction processing start, for example, after a certain period of time following the start of the data acquisition processing by the animal behavior recording device 100.

The behavior estimation processing and the estimation result correction processing illustrated in FIG. 13 are executed at regular time intervals for each cow C being bred within the cattle barn CB, specifically for each sensor device 200 attached to each cow C (loop of Step S41). In the present embodiment, for example, the time interval for executing the behavior estimation processing and the estimation result correction processing is one hour for each cow C, and the processing starts one hour after the start of the data acquisition processing illustrated in FIG. 12, and is executed every hour thereafter. However, the execution time interval is not limited to this and may be appropriately determined.

The behavior estimation unit 115 of the animal behavior recording device 100 distinguishes whether the cow C is moving, and estimates the place where the cow C stays in the cattle barn CB, based on the location information recorded in the behavior record storage unit 123 (Step S42). As described above, in the present embodiment, the data acquisition processing is executed at time intervals of about 0.2 to 1 second to acquire the location information and the sensor data. When the data is acquired every second, then 3, 600 sets of data per hour are accumulated for each sensor device 200. The behavior estimation unit 115 estimates the behavior of the cow C to which the sensor device 200 is attached, based on the data accumulated in the behavior record storage unit 123 over the past one hour. In Step S42, the chronologically recorded location information is used for estimating whether the cow C was moving in the cattle barn CB and where in the cattle barn CB the cow C was staying at each data acquisition time.

The estimation result correction unit 116 compares the estimation results determined in Step S42 regarding whether the cow C was moving within the cattle barn CB at each data acquisition time and where in the cattle barn CB the cow C was staying, with the behavior type of the cow C estimated from the sensor data (Step S43). The policies for correcting behavior types based on this comparison can be appropriately specified. One example is described as follows.

In a case where the location information leads to estimation that "the cow C is not moving much" and "the cow C stays in the resting place (a place other than the feeding area, the milk-feeding area, and the water-drinking area) within the cattle barn CB", the behavior type is estimated as one of the "lying down state" indicating resting, the "standing state", or the "rumination" indicating low body movement. Similarly, in a case where the location information leads to estimation that "the cow C is not moving much" and "the cow C stays in the feeding area within the cattle barn CB", the behavior type is estimated as one of the "lying down state" indicating resting, the "standing state", or the "rumination" or "feeding" indicating low body movement. In a case where the location information leads to estimation that "the cow C is moving", the behavior type is estimated as either "moving (walking)" or "moving (running)".

The estimation result correction unit 116 corrects the behavior determined based on the location information in Step S43 by considering the behavior type estimated based on the sensor data, and records the corrected behavior type in the behavior record storage unit 123 (step S44).

According to the animal behavior recording device 100 in the second embodiment, the behavior of the cow C within the cattle barn CB can be understood firstly based on the location information, and then compared with the behavior type estimated from the sensor data at the same time, allowing for appropriate correction.

<Behavior Type Estimation Results for Cow C According to Embodiments of Present Invention>

FIG. 14 illustrates behavior type estimation results for the cow C acquired by the animal behavior recording device 100 according to the first embodiment of the present invention. FIG. 14 illustrates the processing results when the behavior types "suckling" and "feeding" are estimated. For each behavior type, the primary estimation results based on the sensor data, the correction results based on continuity verification, and the final correction results based on continuity and location information are illustrated in histograms. In the horizontal axis of the graph in FIG. 14, the actual time spent for suckling and feeding was measured from video observations, and the difference between the actual time and the predicted time was calculated every hour over the past 24 hours. For each behavior type, it was demonstrated that, by verifying the continuity of the primary estimation results and executing additional corrections based on the location information, the time difference from the actual behavior time is reduced (the frequency of zero time difference increases), thus improving the accuracy in predicting the behavior types.

<Behavior Recording by Animal Behavior Recording Device 100>

Figure 15:
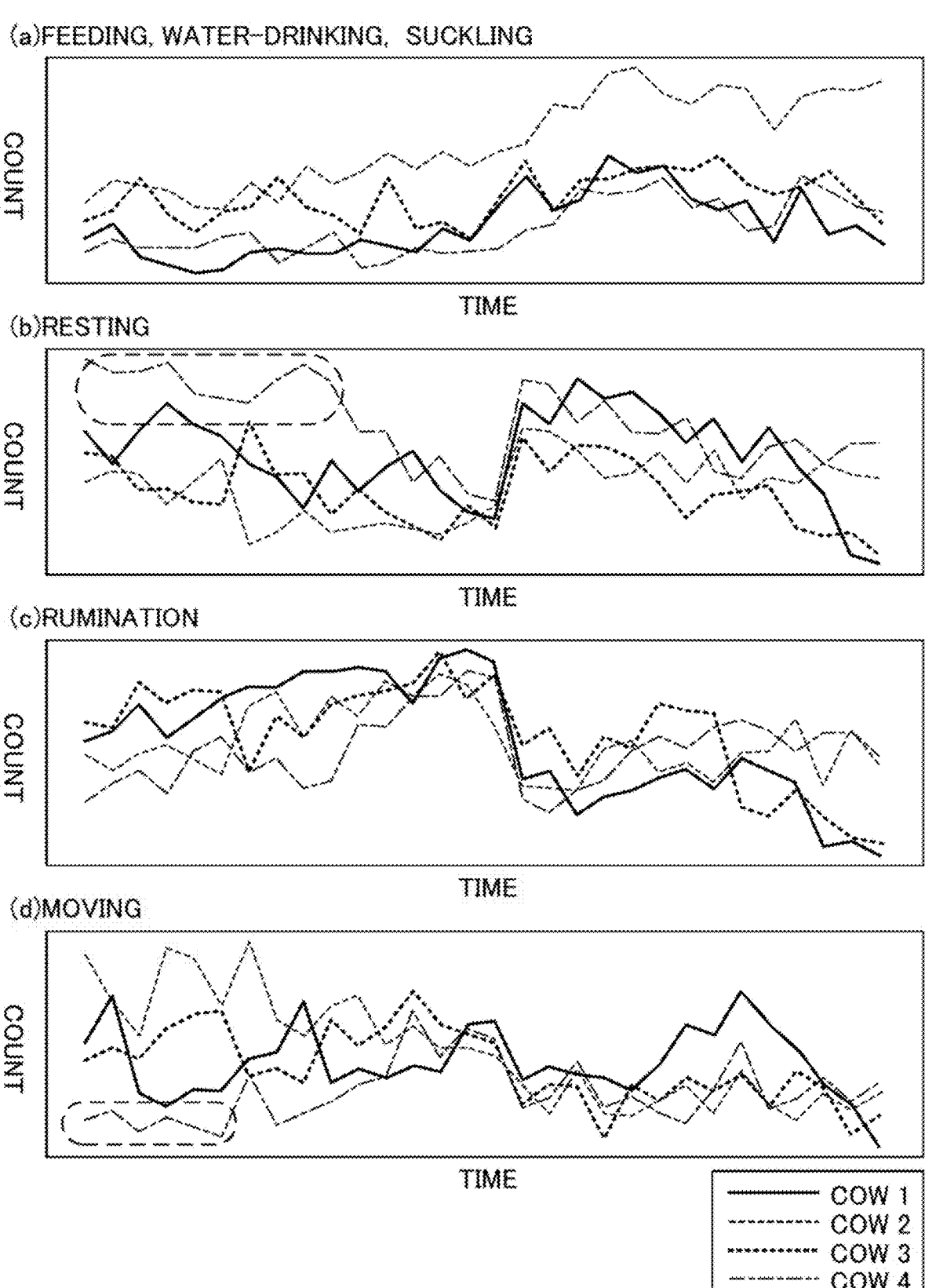
FIG. 15 is a graph illustrating the behavior recording results according to the present embodiment.

FIG. 15 is a graph illustrating the temporal changes in the behavior types recorded by the animal behavior recording device 100 according to the first embodiment. Such a graph can be displayed on a display, for example, through input operations from the input/output unit 130 of the animal behavior recording device 100. FIG. 15 illustrates an example of the behavior records of each cow within the cattle barn CB where four cows, cow 1 to cow 4, are bred. Each graph categorizes the behavior types into four patterns: (a) eating/drinking behavior including feeding, drinking water, and suckling, (b) resting behavior including the standing state and the lying down state, (c) ruminating, and (d) moving behavior including walking and running, in which the temporal changes in frequency for each cow are illustrated with line graphs. Such records of the behavior types of the cow C can be used, for example, to predict changes in health conditions, diseases foreseen by the health conditions, and calving. For instance, focusing on the behavior record of the cow 4 indicated by the dashed line in FIG. 15, it can be observed that the frequency of resting (b) is higher than other cows, and the frequency of moving (d) is lower than other cows, as highlighted by the broken lines. This suggests that the cow 4 may be experiencing some health changes or other conditions that are leading to reduced activity levels. Thus, it is possible to detect signs of health changes, diseases, estrus, calving, and weaning in the cow C, based on the temporal changes in the behavior types of the cow C recorded by the animal behavior recording device 100 according to the embodiments of the present invention. For example, by generating a trained model that has been pre-trained with the pattern changes in the behavior types (a) to (d) illustrated in FIG. 15, and the health changes, diseases, estrus, calving, and weaning observed for each cow C, it becomes possible to capture the signs of health changes and diseases in the cow C, based on the behavior types recorded by the animal behavior recording device 100.

According to the above-described embodiments, the following effects can be achieved.

The animal behavior recording device 100 according to the present embodiment includes a processing unit 110 that acquires the animal behavior information that is information indicating the animal behavior, acquires the animal location information that is information indicating the location where the animal exists, and estimates and chronologically records the animal behavior, based on the animal behavior information and the animal location information.

This ensures that the animal behavior can be accurately and efficiently understood.

The animal behavior information may be the acceleration data acquired from the accelerometer 210 and/or the angular velocity data acquired from the angular velocity sensor 220 provided in the sensor device 200 attached to the animal. The processing unit 110 may include: the behavior estimation unit 115 that estimates the behavior of the animal, based on the acceleration data and/or the angular velocity data; and the estimation result correction unit 116 that corrects the animal behavior estimated by the behavior estimation unit 115, based on the animal location information.

This ensures that the animal behavior estimated based on the acceleration data and/or the angular velocity data is corrected based on the animal location information, improving the accuracy in estimating the animal behavior.

The storage unit 120 may store information on the locations of a plurality of types of installations necessary for breeding the cow C within the cattle barn CB. The estimation result correction unit 116 may identify the type of installation where the target cow C exists, based on the stored location information on the installations and the cow C, and correct the behavior of the cow C estimated by the behavior estimation unit 115, based on the identified type of installation. The installations include the areas such as the feeding area F, the milk-feeding area M, and the water-drinking area W.

This ensures that the estimated behavior of the cow C is corrected based on the type of installation corresponding to the location of the cow C, improving the accuracy in estimating the behavior of the cow C.

The animal behavior information may be the acceleration data acquired from the accelerometer provided on the animal and/or the angular velocity data acquired from the angular velocity sensor provided on the animal. The processing unit 110 may include: the behavior estimation unit 115 that estimates the location where the animal exists and the behavior of the animal at the location, based on the animal location information; and the estimation result correction unit 116 that corrects the estimated location where the animal exists and the estimated behavior of the animal, through comparison with the acquired animal behavior information.

This ensures that the animal behavior estimated based on the animal location information is corrected based on the acceleration data and/or the angular velocity data, improving the accuracy in estimating the animal behavior.

The storage unit 120 may store information on the locations of a plurality of types of installations necessary for breeding the cow C within the cattle barn CB. The behavior estimation unit 115 may identify the type of installation at the location where the target cow C exists, based on the stored location information on the installations and the cow C, and estimate the behavior of the target cow C, based on the identified type of installation.

This ensures that the behavior of the cow C can be accurately estimated based on the type of installation corresponding to the location of the cow C.

The behavior estimation unit 115 may estimate the animal behavior by using a trained model that has been pre-trained with the relationship between the acceleration data and/or angular velocity data acquired from the animal and the animal behavior categorized into a plurality of types.

This ensures that the accuracy of the animal behavior estimation results based on the acceleration data and/or angular velocity data acquired from the animal can be improved by using a machine learning architecture.

The behavior estimation unit 115 may estimate the animal behavior, based on the statistical correspondence relationship between the animal behavior and the acceleration data and/or angular velocity data acquired from the animal.

This ensures that the accuracy of the animal behavior estimation results based on the acceleration data and/or angular velocity data acquired from the animal can be improved based on the statistical correspondence relationship.

The animal location information may be calculated based on the direction of arrival of the radio waves transmitted via the communication unit from the accelerometer and/or angular velocity sensor provided on the animal.

This ensures that the location information on the animal can be acquired using the radio waves transmitted from the sensor device 200 provided on the animal.

The behavior records of the animal chronologically recorded by the processing unit 110 may be used for predicting a point in time of at least one of disease, estrus, calving, fall, growth, or weaning of the animal.

This ensures that events such as disease, estrus, calving, fall, growth, and weaning of the animal can be timely identified without missing any occurrences, based on the behavior records of the animal.

The animal behavior information may include at least one of the output data from the barometric sensor and/or acoustic sensor provided on the animal, or the biological information acquired from the animal.

This ensures that the basic data for estimating the animal behavior increases, thereby improving the accuracy in estimating the behavior.

The series of processing described above can be executed by hardware or by software. In other words, the functional configurations illustrated in FIGS. 2 and 3 are merely illustrative and are not particularly restrictive. That is, the animal behavior recording device 100 only needs to include the functions capable of executing the series of processing described above as a whole, and the specific functional blocks used for implementing the functions are not limited to the examples illustrated in FIGS. 2 and 3. A single functional block may be configured solely by hardware, solely by software, or by a combination of both. The functional configurations in the present embodiment are implemented by the processor that executes arithmetic processing. The processor usable in the present embodiment includes not only various processing devices such as single processors, multiprocessors, and multicore processors alone, but also combinations of these processing devices with processing circuits such as ASICs (Application Specific Integrated Circuits) or FPGAs (Field-Programmable Gate Arrays).

When executing the series of processing by software, the program constituting the software is installed on a computer from a network or recording medium. The computer may be a computer embedded in dedicated hardware. The computer may also be a computer capable of executing various functions by installing various programs, such as a general-purpose personal computer.

The recording medium containing such a program may be configured not only by removable media such as USB memory distributed separately from the device body to provide the program to the user but also by recording media provided to the user in a state pre-installed in the device body. Removable media may be configured by, for example, magnetic disks (including floppy disks), optical disks, or magneto-optical disks. The optical disks may be configured by, for example, CD-ROMs (Compact Disk-Read Only Memory), DVDs (Digital Versatile Disks), Blu-ray (registered trademark) Discs, etc. The magneto-optical disks may be configured by MDs (Mini-Disks), etc. The recording media provided to the user in a state pre-installed in the device body may be configured by, for example, ROMs or hard disks included in the storage unit 120 where the program is recorded.

In this specification, the steps describing the program recorded on the recording medium include not only the processing executed in chronological order but also processing executed in parallel or individually, not necessarily in chronological order.

Although some embodiments of the present invention have been described above, these embodiments are merely examples and do not limit the technical scope of the present invention. The present invention can take various other embodiments, and the configurations of the embodiments and modifications can be combined. Furthermore, various changes such as omissions and substitutions can be made without departing from the spirit of the present invention.

These embodiments and their modifications are included in the scope and spirit of the invention described in this specification and are also included in the scope of the invention described in the claims and their equivalents.

EXPLANATION OF REFERENCE NUMERALS

1: animal behavior recording system
100: animal behavior recording device
110: processing unit
115: behavior estimation unit
116: estimation result correction unit
120: storage unit
121: behavior estimation model storage unit
123: behavior record storage unit
200: sensor device
210: three-axis accelerometer
220: three-axis angular velocity sensor
300: location detector

The invention claimed is:

1. An animal behavior recording device, comprising:
a location data receiving unit that acquires animal behavior information that is information indicating behavior of an animal being bred within a predefined breeding area;
an animal location information acquisition unit that acquires animal location information that is information indicating a location where the animal exists;
an estimation result correction unit that counts the number of behavior types identified based on the acquired animal behavior information and animal location information, compares the identified behavior types and executes correction; and
an estimation result recording unit that estimates and chronologically records the corrected behavior of the animal, based on the animal behavior information and the animal location information.

2. The animal behavior recording device according to claim 1, wherein
the animal behavior information is acceleration data acquired from an accelerometer provided on the animal and/or angular velocity data acquired from an angular velocity sensor provided on the animal, and
the animal behavior recording device further comprising:
a behavior estimation unit that estimates the behavior of the animal, based on the acceleration data and/or the angular velocity data; and an estimation result correction unit that corrects the behavior of the animal estimated by the behavior estimation unit, based on the animal location information.

3. The animal behavior recording device according to claim 2, further comprising:
a storage unit that stores information on locations of a plurality of types of installations necessary for breeding the animal, the installations being arranged in the breeding area, wherein
the estimation result correction unit identifies a type of installation at a location where a target animal exists, based on stored location information on the installation and the animal location information, and corrects the behavior of the animal estimated by the behavior estimation unit, based on the type of the installation identified.

4. The animal behavior recording device according to claim 1, wherein,
the animal behavior information is acceleration data acquired from an accelerometer provided on the animal and/or angular velocity data acquired from an angular velocity sensor provided on the animal, and
the animal behavior recording device further comprising:
a behavior estimation unit that estimates a location where the animal exists and behavior of the animal at the location, based on the animal location information; and an estimation result correction unit that corrects the estimated location where the animal exists and the estimated behavior of the animal, through comparison with the animal behavior information acquired.

5. The animal behavior recording device according to claim 4, further comprising:
a storage unit that stores information on locations of a plurality of types of installations necessary for breeding the animal, the installations being arranged in the breeding area, wherein
the behavior estimation unit identifies a type of installation at a location where a target animal exists, based on the stored location information on the installation and the animal location information, and estimates behavior of the target animal, based on the type of installation identified.

6. The animal behavior recording device according to claim 2, wherein the behavior estimation unit estimates the behavior of the animal using a trained model that has been pre-trained with a relationship between the acceleration data and/or angular velocity data acquired from the animal and the behavior of the animal categorized into a plurality of types.

7. The animal behavior recording device according to claim 2, wherein the behavior estimation unit estimates the behavior of the animal, based on a statistical correspondence relationship between the behavior of the animal and the acceleration data and/or angular velocity data acquired from the animal.

8. The animal behavior recording device according to claim 2, wherein the animal location information is calculated based on a direction of arrival of radio waves transmitted via a communication unit from the accelerometer and/or angular velocity sensor provided on the animal.

9. The animal behavior recording device according to claim 1, wherein animal behavior records being chronologically recorded by the animal behavior recording unit are used for predicting a point in time of at least one of disease, estrus, calving, fall, growth, or weaning of the animal.

10. The animal behavior recording device according to claim 1, wherein the animal behavior information includes at least one of output data from a barometric sensor and/or an acoustic sensor provided on the animal or biological information acquired from the animal.

11. An animal behavior recording method, causing an information processing device to execute processing comprising:

acquire animal behavior information that is information indicating behavior of an animal being bred within a predefined breeding area;

acquire animal location information that is information indicating a location where the animal exists;

count the number of behavior types identified based on the acquired animal behavior information and animal location information, compare them and execute correction; and estimate and chronologically record the corrected behavior of the animal, based on the animal behavior information and the animal location information.

12. A program for causing an information processing device to execute processing comprising:

acquiring animal behavior information that is information indicating behavior of an animal being bred within a predefined breeding area;

acquiring animal location information that is information indicating a location where the animal exists;

count the number of behavior types identified based on the acquired animal behavior information and animal location information, compare them and execute correction; and estimating and chronologically recording the corrected behavior of the animal, based on the animal behavior information and the animal location information.

* * * * *